United States Patent
Hsu

(10) Patent No.: US 6,661,123 B2
(45) Date of Patent: Dec. 9, 2003

(54) POWER CONTROL CIRCUIT WITH POWER-OFF TIME DELAY CONTROL FOR MICROPROCESSOR-BASED SYSTEM

(75) Inventor: Shi-Fa Hsu, Taipei (TW)

(73) Assignee: Mitac International Corp., Hsinchu (TW)

( * ) Notice: Subject to any disclaimer, the term of this patent is extended or adjusted under 35 U.S.C. 154(b) by 49 days.

(21) Appl. No.: 10/015,553

(22) Filed: Dec. 17, 2001

(65) Prior Publication Data

US 2003/0111911 A1 Jun. 19, 2003

(51) Int. Cl.$^7$ ................................................ H01H 7/00
(52) U.S. Cl. ........................ 307/141; 307/140; 713/310
(58) Field of Search ............................ 307/43, 45, 126, 307/140, 141; 713/310, 330, 340, 300

(56) References Cited

U.S. PATENT DOCUMENTS

| | | | | |
|---|---|---|---|---|
| 4,719,364 A | * | 1/1988 | Pequet et al. ................ 307/141 |
| 4,930,062 A | * | 5/1990 | Yamada ........................ 363/55 |
| 5,150,100 A | * | 9/1992 | Black et al. ................. 340/555 |
| 5,424,903 A | * | 6/1995 | Schreiber ..................... 361/166 |
| 5,541,458 A | * | 7/1996 | Hirst .............................. 307/66 |
| 5,598,567 A | * | 1/1997 | Ninomiya .................... 713/310 |
| 5,783,927 A | * | 7/1998 | Chen ............................ 320/110 |
| 5,815,409 A | * | 9/1998 | Lee et al. .................... 700/286 |
| 5,923,103 A | * | 7/1999 | Pulizzi et al. ............... 307/126 |
| 6,115,824 A | * | 9/2000 | Ha .............................. 713/330 |
| 6,240,520 B1 | * | 5/2001 | Cha ............................ 713/310 |

\* cited by examiner

*Primary Examiner*—Brian Sircus
*Assistant Examiner*—Sharon A. Polk
(74) *Attorney, Agent, or Firm*—Rosenberg, Klein & Lee

(57) ABSTRACT

A power control circuit with a power off time delay circuit for controlling an AC power supply to a microprocessor-based system is disclosed. The control circuit includes a relay, a switch unit, a DC power supply unit, a manually operable switch, and a time delay control circuit. The time delay control circuit is capable of controlling a turn-on and a delayed turn-off of the switch unit depending on the status of a DC operating voltage. When the manually operable switch is turned on, the AC power supply is supplied to the microprocessor-based system in a normal condition. When the manually operable switch is turned off, the AC power supply is still maintained to the microprocessor-based system for a predetermined delay time.

2 Claims, 3 Drawing Sheets

POWER CONTROL CIRCUIT WITH POWER-OFF TIME DELAY CONTROL FOR MICROPROCESSOR-BASED SYSTEM

BACKGROUND of the INVENTION

1. Field of the Invention

The present invention relates to a power control circuit, and more particularly to a power control circuit with a power off time delay circuit for delaying cut-off of an AC power supply to a microprocessor-based system.

2. Description of the Prior Art

Most of microprocessor-based systems or computer systems normally include a series of power-on and power-off sequences. The power-off or power shutdown sequence is especially important to the computer system and must be followed in order to avoid undesired loss or damage of data.

FIG. 1 is a schematic waveform diagram showing a waveform of a DC operating voltage Vcc at power-on and power-off of a microprocessor-based system, such as a personal computer device or a liquid crystal display (LCD) connected to a computer system, for data access. The DC operating voltage Vcc is typically obtained from an AC power supply of the commercial electricity via an electrical power supply system.

Ideally, when an operator powers off the computer system by manually operating a power switch, a proper shutdown sequence should enable the DC operating voltage Vcc to be normally supplied for a predetermined delay time t1 until the current data access is completely accomplished. Similarly, in a proper power-on sequence, the data access should be performed only when the operating voltage Vcc has become fully stabilized.

However, with the conventionally designed power supply circuits, the AC power supply is cut off immediately after a user turns off the power switch of the computer system. This would instantly cut off the DC operating voltage Vcc to the computer system. Once the computer system is powered off, the necessary shutdown sequence is impossible to be finished, resulting in incomplete or improper access of data.

A conventional approach of solving this problem described above is to additionally couple a known capacitor across the DC operating voltage Vcc. The capacitor is selected to have a considerable large capacitance sufficient to temporarily supply a DC power to the central processing unit of the computer system in case the AC power supply is cut off. This prior art solution enables the central processing unit to temporarily obtain a DC operating voltage Vcc, but it does not activate the whole computer system to perform the necessary shutdown sequence.

It is therefore desirable to develop a power control circuit with power off time delay control to solve the above-mentioned problems encountered in the course of shutdown of a microprocessor-based system.

SUMMARY OF THE INVENTION

Consequently, the primary object of the present invention is to provide a power control circuit with power off time delay control for the microprocessor-based system. The control circuit enables a delayed cut-off of operating voltage supplied to the microprocessor-based system when a user manually powers off the microprocessor-based system, allowing the microprocessor-based system to have sufficient time and electric power to complete the necessary data access and execute the normal shut down sequence.

Another object of the present invention is to provide a power off time delay control circuit for a computer system. A central processing unit of the computer system is designed to monitor the voltage supplying status through an operating voltage detection line. So, when an operator turns off the power switch of the computer system, the control circuit would enable supply of a normal DC operating voltage to the computer system for a predetermined time.

DETAILED DESCRIPTION OF THE PREFERRED EMBODIMENTS

Figure 1:
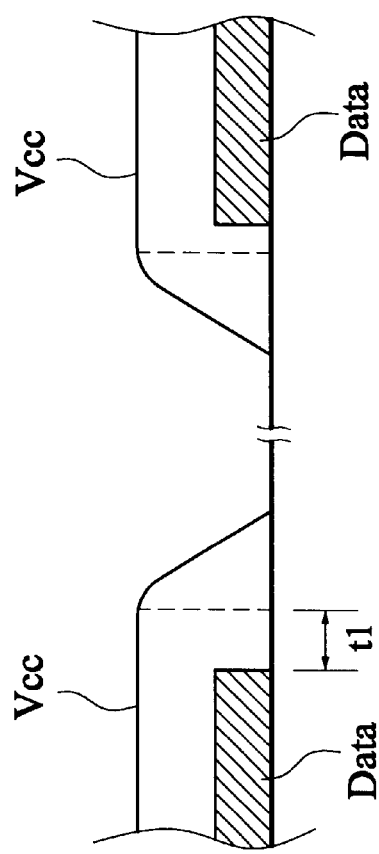
FIG. 1 is a schematic waveform diagram of a DC operating voltage at power-on and power-off of a computer system for data access according to prior art.
Figure 2:
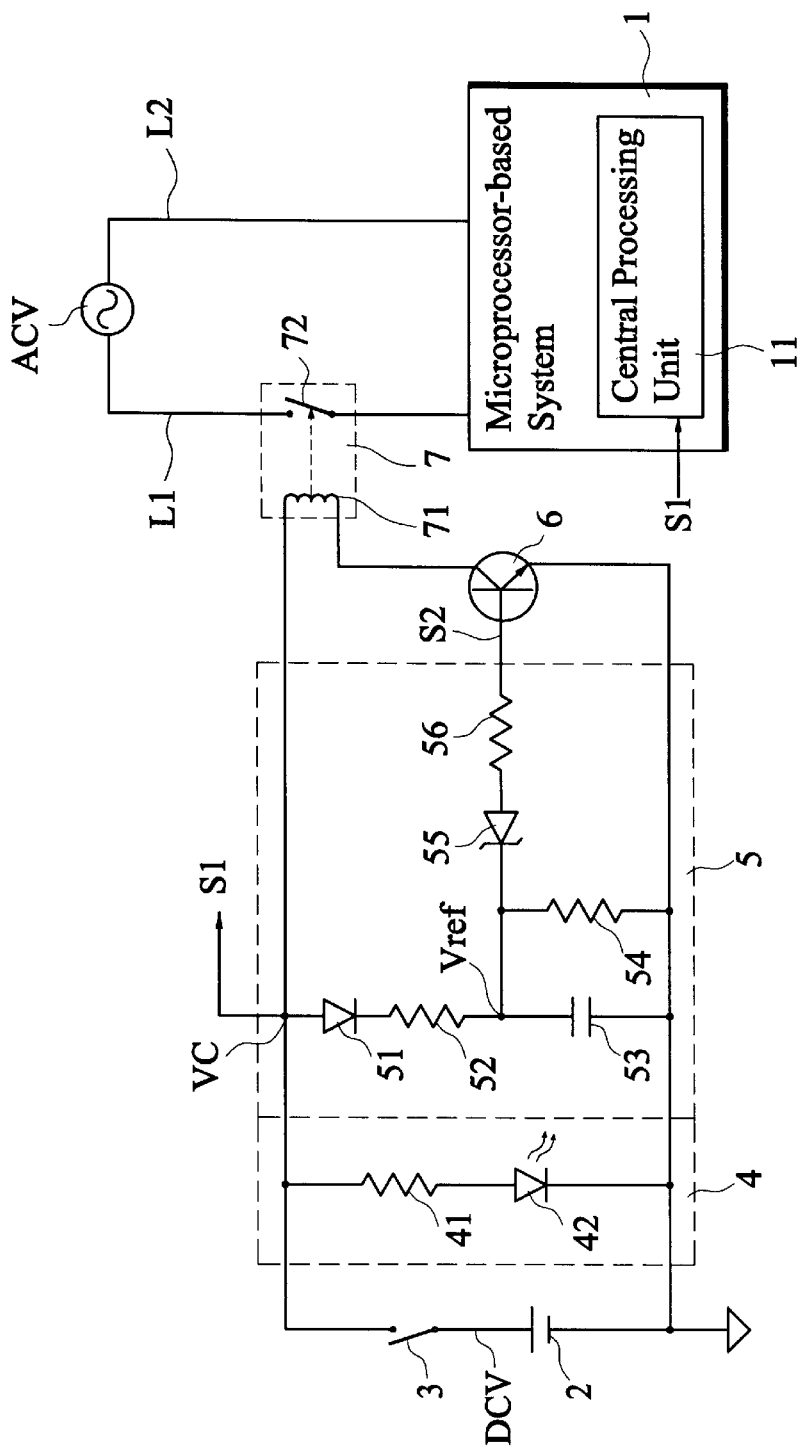
FIG. 2 is a detailed control circuit diagram in accordance with a first embodiment of the present invention.

With reference to FIG. 2, a schematic control circuit diagram of the power control circuit in accordance with a first embodiment of the present invention is shown. A computer system or a microprocessor-based system 1 is provided with a microprocessor or a central processing unit 11 therein. The microprocessor-based system 1 is powered by an AC power supply source ACV through a pair of power lines PL1 and PL1.

As illustrated in FIG. 2, the control circuit of the present invention mainly includes a DC power supply unit 2, a manually operable switch 3, an indicator circuit 4, a time delay control circuit 5, a switch unit 6, and an electromagnetic relay 7.

In the illustrated embodiment, the DC power supply unit 2 may be a battery set capable of supplying a DC power supply DCV to the control circuit of the present invention. The manually operable switch 3 is electrically connected in series with the DC power supply unit 2, serving as a connecting means for supplying a DC operating voltage VC to the indicator circuit 4 and the time delay control circuit 5.

Besides, the DC operating voltage VC is supplied to the central processing unit 11 of the microprocessor-based system 1 through an operating voltage detection line S1. So, the central processing unit 11 is able to detect an open-circuit or a closed-circuit state of the manually operable switch 3 by detecting the operating voltage VC on the operating voltage detection line S1.

The indicator circuit 4 is composed of a resistor 41 and a light-emitting diode indicator 42. The indicator 42 and the resistor 41 are electrically connected in series and then connected across the DC operating voltage VC for indicating whether the DC operating voltage VC is normally supplied from the DC power supply unit 2 or not.

The time delay control circuit 5 is designed to generate a triggering signal S2 to the switch unit 6 for controlling turn-on or turn-off of the switch unit 6. The switch unit 6 may be a well-known power transistor or other functionally similar electronic switch. The time delay control circuit 5 is electrically connected across the DC operating voltage VC, so as to control the turn-on and the turn-off delay time of the switch unit 6 based on the supplying status of the DC operating voltage VC.

The time delay control circuit 5 includes a charging circuit consisting of a diode 51, a resistor 52, and a capacitor 53 connected in series. The positive terminal of the diode 51 is connected to the DC operating voltage VC, and the negative terminal thereof is connected to one end of the resistor 52. A reference voltage Vref is obtained between the junction of the resistor 52 and the capacitor 53.

A discharging resistor 54 is connected in parallel to the junction between the resistor 52 and the capacitor 53 to provide an electric current discharge path during a discharge process.

Further, a known Zener diode 55 and a resistor 56 are connected in series. The negative terminal of the Zener diode 55 is coupled to the junction between the resistor 52 and the capacitor 53, and the positive terminal of the Zener diode 55 is connected to one end of the resistor 56. The other end of the resistor 56 is further connected to a base end of the switch unit 6 for controlling the turn-on and the turn-off of the switch unit 6. The switch unit 6 has a collector end and an emitter end connected in series with a relay coil 71 of the electromagnetic relay 7 and then connected across the DC operating voltage VC.

Through the turn-on and turn-off control of the switch unit 6, the excitation of the relay coil 71 may be controlled. The relay 7 is provided with a normal open contact 72 connected in series with the power line PL1 for controlling supply of the AC power supply ACV to the computer system 1.

When the manually operable switch 3 is turned on, the central processing unit 11 of the microprocessor-based system 1 immediately detects the DC operating voltage VC through the operating voltage detection line S1. Meanwhile, the capacitor 53 of the time delay control circuit 5 starts charging through the diode 51 and the resistor 52, so as to generate a reference voltage Vref at the junction point between the resistor 52 and the capacitor 53. When the reference voltage Vref reaches a threshold voltage of the Zener diode 55, a triggering signal S2 is outputted to the base end of the switch unit 6, so that the switch unit 6 is conductive. At this time, the coil 71 of the relay 7 is energized and the normal open contact 72 thereof is closed. So, the AC power supply ACV supplies electric power to the microprocessor-based system 1 in a normal condition.

To cut off the power supply to the computer system 1, a user may operate the manually operable switch 3 to open the manually operable switch 3. At this time, the DC power supply DCV of the DC power supply unit 2 to the control circuit of the present invention is terminated. The central processing unit 11 of the microprocessor-based system 1 detects the termination of the DC operating voltage VC and therefore detects the open state of the manually operable switch 3. At this point, a predefined power shutdown sequence to the microprocessor-based system 1 is performed. At the same time, a discharge process is performed to the time delay control circuit 5.

In the discharge process of the time delay control circuit 5, a discharging current from the capacitor 53 passes through the resistor 54. When a predetermined delay time lapses and the reference voltage Vref reaches a voltage level lower than the threshold voltage of the Zener diode 55, the time delay control circuit 5 stops outputting the triggering signal S2 to the switch unit 6. Therefore, the relay coil 71 of the relay 7 is in a de-energized state and then the normal open contact 72 is opened to cut off the AC power supply ACV to the microprocessor-based system 1. Based on the requirement of the microprocessor-based system, the time delay control circuit may be designed to have sufficient power off delay time to allow the microprocessor-based system to completely perform the predefined power shutdown sequence.

Figure 3:
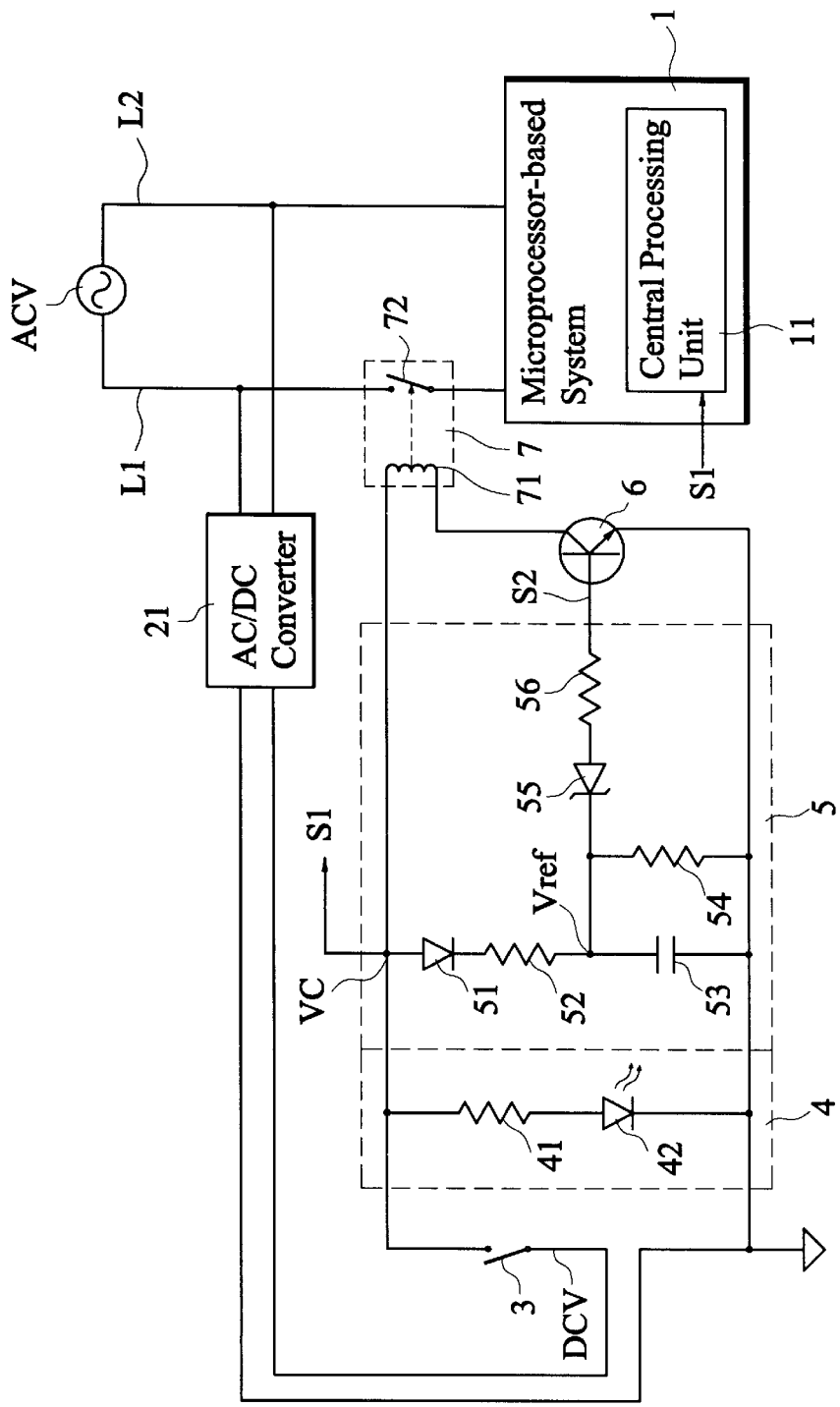
FIG. 3 is a detailed control circuit diagram in accordance with a second embodiment of the present invention.

With reference to FIG. 3, a schematic control circuit diagram in accordance with a second embodiment of the present invention is shown. Similar to the previous embodiment shown in FIG. 2, the control circuit mainly includes a manually operable switch 3, an indicator circuit 4, a time delay control circuit 5, a switch unit 6, and an electromagnetic relay 7. However, a known AC to DC voltage converter 21 is adapted to converting the AC power supply ACV to a DC power supply DCV for supplying a DC operating voltage VC to the control circuit.

The present invention has been described with a preferred embodiment thereof and it is understood that many changes and modifications in the described embodiment can be carried out without departing from the scope and the spirit of the invention that is intended to be limited only by the appended claims.

I claim:

1. A power control circuit, for controlling an AC power supply through a pair of AC power lines to a microprocessor-based system having a central processing unit, comprising:

a relay having a coil and a normally open contact, the normally open contact being connected in series with one of the AC power lines;

a switch unit connected in series with the coil of the relay;

means for supplying DC power;

a manually operable switch connected in series with the means for supplying DC power for supplying a DC operating voltage from the means for supplying DC power, the DC operating voltage being supplied to the central processing unit through an operating voltage detection line coupled to the manually operable switch; and,, a time delay control circuit for controlling a turn-on and a delayed turn-off of the switch unit in response to a status of the DC operating voltage, the time delay control circuit including:

(a) a charging circuit electrically connected across the DC operating voltage, having a charging resistor and a capacitor connected in series;

(b) a discharging resistor connected across the capacitor of the charging circuit, providing a discharging path for the charging circuit; and (c) a Zener diode having a negative terminal and a positive terminal, the negative terminal being connected to a junction point of the charging resistor and the capacitor of the charging circuit, and the positive terminal being coupled to the switch unit via a resistor;

the time delay control circuit outputs a trigger signal to control the switch unit to energize the coil of the relay and thereby close the normally open contact of the relay for supply AC power to the microprocessor-based system responsive to the manually operable switch being turned on, and responsive to the manually operable switch being turned off, the time delay control circuit continues to output the triggering signal to control the switch unit to energize the coil of the relay for a predetermined delay time and thereby maintain the normally open contact of the relay closed and AC power supplied to the microprocessor-based system until the predetermined delay time has elapsed.

2. The power control circuit as claimed in claim 1, further comprising a diode having a positive terminal connected to the DC operating voltage and a negative terminal connected in series with the charging resistor of the charging circuit.

* * * * *